United States Patent
Freudelsperger

(10) Patent No.: US 7,225,918 B2
(45) Date of Patent: Jun. 5, 2007

(54) TRANSPORT DEVICE FOR TRANSPORTING GOODS, PREFERABLY ON PALLETS, COMPRISING TWO LATERALLY PERIPHERAL TRACTION ELEMENTS, ESPECIALLY TRANSPORT CHAINS

(75) Inventor: Karl Freudelsperger, Hart bei Graz (AT)

(73) Assignee: Knapp Logistik Automation GMBH (AT)

( * ) Notice: Subject to any disclaimer, the term of this patent is extended or adjusted under 35 U.S.C. 154(b) by 0 days.

(21) Appl. No.: 10/556,240

(22) PCT Filed: Jun. 21, 2004

(86) PCT No.: PCT/EP2004/006688

§ 371 (c)(1),
(2), (4) Date: Nov. 8, 2005

(87) PCT Pub. No.: WO2005/003000

PCT Pub. Date: Jan. 13, 2005

(65) Prior Publication Data

US 2006/0289282 A1    Dec. 28, 2006

(30) Foreign Application Priority Data

Jul. 2, 2003   (DE)  ................... 203 10 084

(51) Int. Cl.
*B65G 17/06*   (2006.01)
(52) U.S. Cl. .............. 198/853; 198/841; 198/817
(58) Field of Classification Search ........... 198/817, 198/850–853, 790, 841
See application file for complete search history.

(56) References Cited

U.S. PATENT DOCUMENTS

| | | | | |
|---|---|---|---|---|
| 2,792,928 A | * | 5/1957 | Holz | 198/853 |
| 2,954,113 A | * | 9/1960 | Hibbard et al. | 198/851 |
| 3,621,986 A | | 11/1971 | Webb | |
| 3,857,478 A | | 12/1974 | Meeusen | |
| 4,167,999 A | | 9/1979 | Haggerty | |
| 4,458,809 A | * | 7/1984 | White et al. | 198/790 |
| 4,930,623 A | | 6/1990 | Johnson et al. | |
| 4,979,358 A | * | 12/1990 | Keip | 198/817 |
| 6,070,716 A | | 6/2000 | Haldimann | |
| 6,308,823 B1 | * | 10/2001 | Stevens | 198/853 |
| 6,896,122 B2 | * | 5/2005 | Gambrell et al. | 198/850 |

FOREIGN PATENT DOCUMENTS

| | | |
|---|---|---|
| DE | 20 45 802 | 4/1971 |
| DE | 27 37 181 | 2/1978 |
| FR | 2807018 | 10/2001 |

* cited by examiner

*Primary Examiner*—James R. Bidwell
(74) *Attorney, Agent, or Firm*—McGlew and Tuttle, PC

(57) ABSTRACT

A transport device for transporting goods, preferably on pallets or the like, along a transport path has at least two lateral peripheral traction elements (2), especially transport chains. To this end, support elements (3) are fixed, preferably articulated, to the peripheral traction elements (2), the goods to be transported or the pallets being supported on the support elements. The support elements (3) are arranged tightly in a row along the traction element, and especially cover the peripheral traction element (2), each peripheral traction element (2) having its own support element (3).

25 Claims, 3 Drawing Sheets

TRANSPORT DEVICE FOR TRANSPORTING GOODS, PREFERABLY ON PALLETS, COMPRISING TWO LATERALLY PERIPHERAL TRACTION ELEMENTS, ESPECIALLY TRANSPORT CHAINS

CROSS REFERENCE TO RELATED APPLICATIONS

This application is a U.S. National Phase application of International Application PCT/EP2004/006688 of Jul. 21, 20032 and claims the benefit of priority under 35 U.S.C. § 119 of German Application DE 203 10 084.0 filed Jul. 2, 2003, the entire contents of which are incorporated herein by reference.

FIELD OF THE INVENTION

The present invention pertains to a transport device for transporting goods, preferably on pallets or the like, along a transport path with at least two lateral, driven peripheral traction elements, especially transport chains.

BACKGROUND OF THE INVENTION

Pallets have hitherto been transported either on rollers or on chains. Rollers function in case of the longitudinal transport of the pallets only, but, depending on the spacing of the rollers, the run is not particularly smooth. Chains can be used for longitudinal and transverse transport. The support surface to the pallet is relatively small. The pallets are correspondingly also spared only slightly, especially in case of heavy loads. The chain must always be lubricated and such chains become "dirty" as a result and this also contaminates the load.

SUMMARY OF THE INVENTION

Based on the above-described state of the art, the object of the present invention is to provide a transport device of the type described in the introduction, which has a simple design, can be used in a versatile manner and transports preferably heavy goods, pallets or the like in such a way that it is gentle on the product and nevertheless operates with low noise.

An essential aspect of the present invention is that support elements, by which the goods or the pallet are carried, are fixed, preferably articulated, to the peripheral traction element.

The support elements are preferably arranged at closely spaced locations from one another in a row along the traction element and essentially cover the peripheral traction element, and each of the two peripheral traction elements preferably have such support elements of their own (an individual support element is assigned exclusively to one of the traction elements), which are not connected to one another. The support elements are of an identical and one-piece design and have a flat upper side in a preferred embodiment variant.

Another aspect of the present invention is that the support elements have exclusively a support function and the traction elements have exclusively a traction function and are structured accordingly.

The support elements may have at least one lower sliding surface and slide on a stationary rail, especially a stainless steel rail, being supported on same, wherein the rail preferably has a longitudinal guiding function for the support elements or the traction elements.

The support elements are preferably plastic parts, especially moldings, which are preferably provided with a self-lubricating effect, good slidability, good compressive strength and/or good impact resistance.

Consequently, a transport device according to the present invention is preferably a plastic link chain, in which the load rests on the plastic links and is slidingly dispersed on a steel guide. The plastic links are fastened to a traction element, preferably a chain. However, embodiments with a toothed belt and a steel cable are conceivable as traction elements.

The load or goods stands on a sufficiently large, clean and essentially closed surface and is transported by same gently and with low noise.

In prior-art embodiments, the goods stand directly on the chain and therefore come directly into contact with the lubricant of the chain. The consequence of this is the inevitable contamination of the goods. Since the lubricant is removed hereby from the chain, the chain must be lubricated again at a corresponding frequency. Conversely, dirt or wear particles will be transferred directly from the goods to the chain and to the chain guide. By contrast, the goods stand on a clean plastic surface in the present invention. Dirt does not enter the chain directly from the goods.

A visually pleasant appearance is obtained as well. The traction element, preferably a chain, is not visible. As a result, the transporter has an aesthetically pleasant and modern appearance. There is a high level of freedom in terms of design concerning the shape and the color of the transporter, which may be provided with a cover.

Improved working conditions are also obtained for human operators. Chain transporters are used in manual stations. For example, pallets are loaded or unloaded there by people. Commissioning is also carried out directly from pallets. People, who are now protected according to the present invention, handle goods in the immediate vicinity of running chains. Due to the chain being protected, workers are not exposed to dirt, either. Thus, the present invention creates advantages in terms of safety engineering due to a nearly closed, clean surface.

The transport device according to the present invention may be called a caterpillar transporter, which is designed for the intended use as a prior-art chain transporter, i.e., for the transverse and longitudinal transport of preferably heavy goods such as pallets, skeleton containers, skids or the like. Additional supporting of the middle skid is preferable during the transverse transport of pallets, either by designing the transporter as a three-stand transporter, i.e., with three driven plate chains, or by arranging an additional roller or sliding strip in the middle.

Other advantageous features of the present invention appear from the following description, in which preferred exemplary embodiments of the present invention are explained in greater detail on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
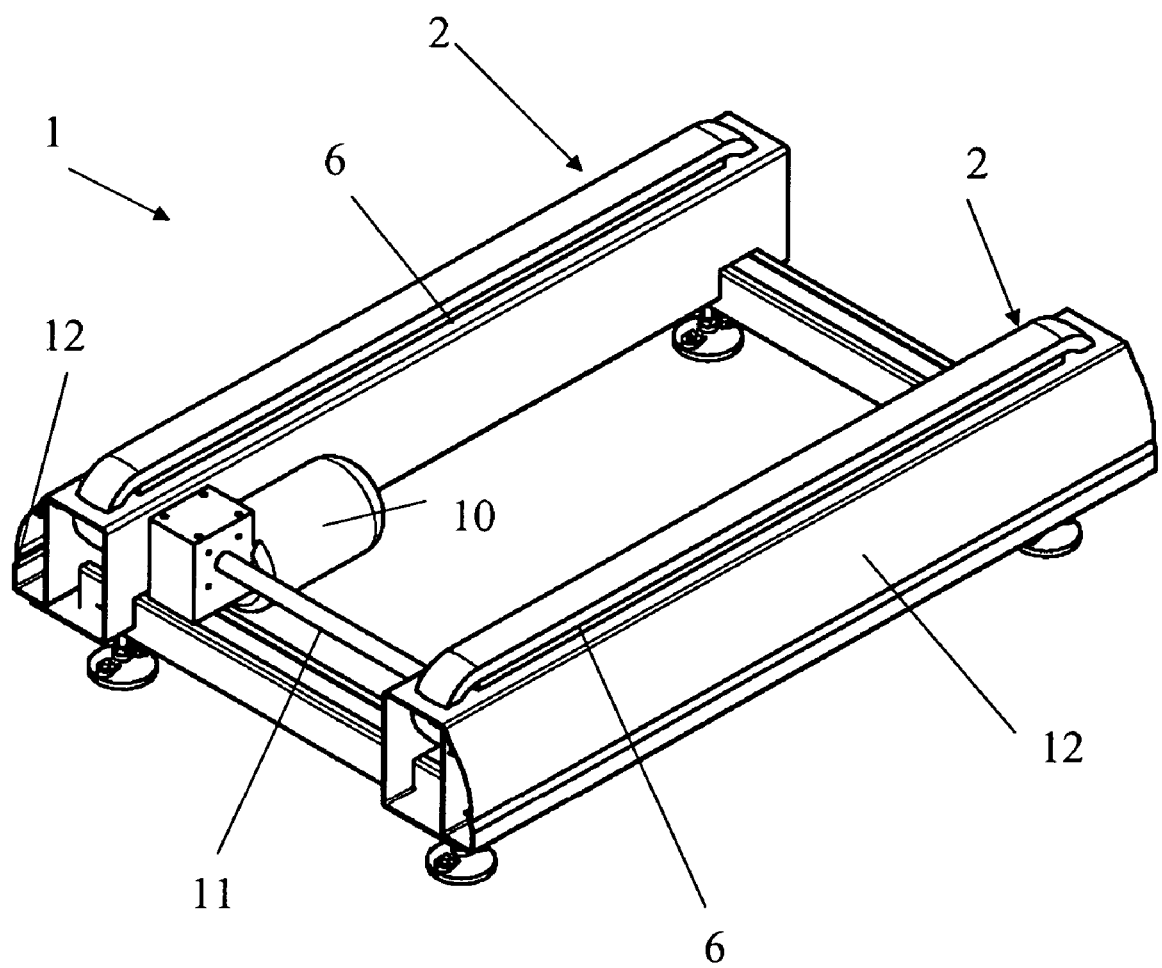
FIG. 1 is a schematic perspective view of a transport device according to the present invention.
Figure 2:
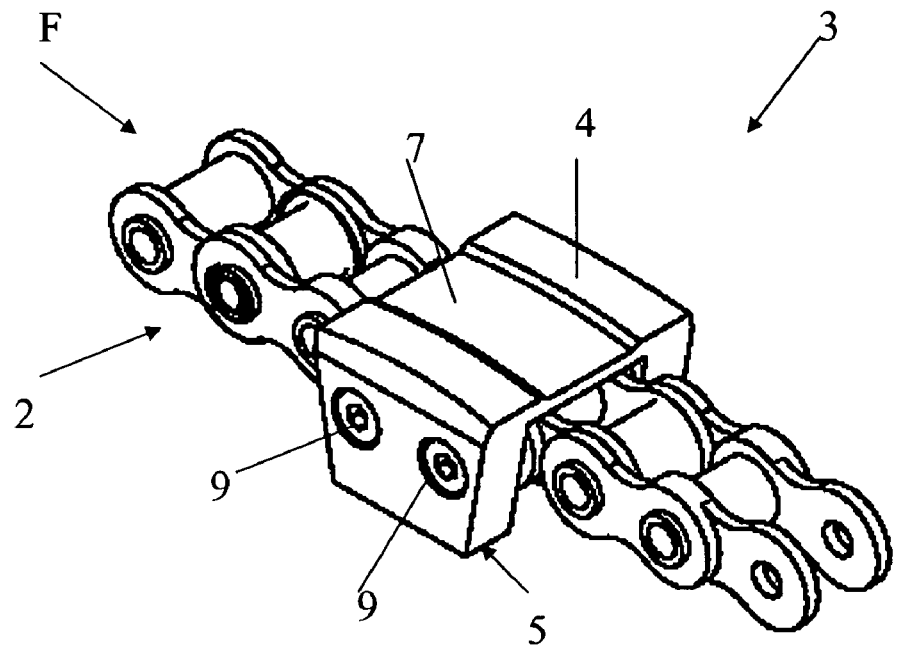
FIG. 2 is a perspective view of the detail of a traction element strand with a support element.
Figure 3:
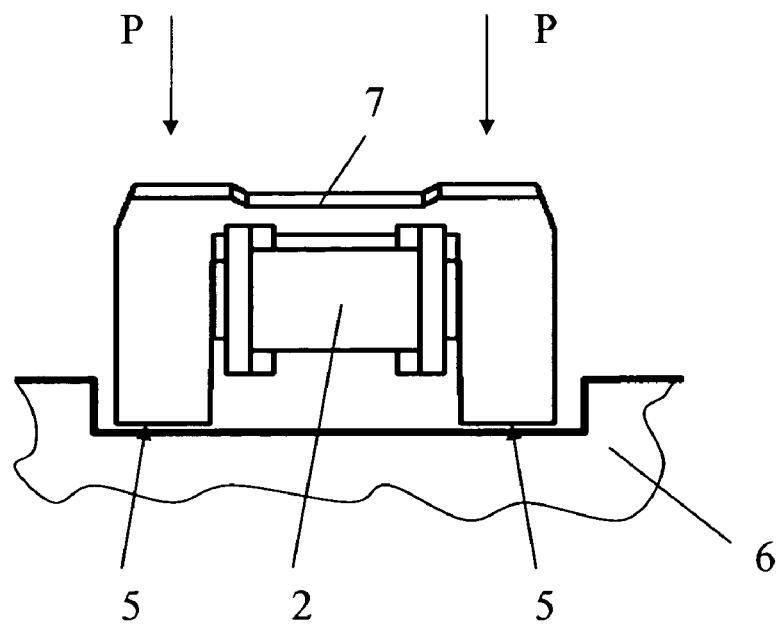
FIG. 3 is a schematic front view of the detail according to FIG. 2, which is supported on a guide rail.

Referring to the drawings in particular, FIGS. 1 through 3 show a first embodiment of a transport device 1 for transporting goods on pallets or the like along a transport path with two lateral, driven peripheral traction elements 2 in the form of transport chains.

The transport device 1 comprises side parts and cross struts and has a single gear motor 10, which directly drives a transversely extending drive shaft 11, on which drive pinions for the traction elements 2 are seated and mesh with lateral peripheral transport chains and drive the latter. Tensioning is performed directly at the deflecting pinions of the peripheral transport chains (peripheral traction elements) 2.

The transporter may also be designed such that the drive is flanged on one side to a side part and a synchronization shaft, which is displaced to tension the chain 2, is seated on the other side. Gear motors may optionally be flanged on both side parts as well.

In particular, the transport device 1 has two lateral, driven peripheral traction elements 2 with articulated support elements 3, which carry the goods or the pallet.

The support elements 3 are arranged at closely spaced locations from one another along the traction element and essentially cover the peripheral traction element 2.

Each peripheral traction element 2 has support elements 3 of its own, which are not connected directly to one another and have an identical and one-piece design and have a flat upper side 4.

The support elements 3 have exclusively a carrying function and the traction elements 2 have exclusively a traction function. The support elements 3 have two lateral lower sliding surfaces 5, and the support elements slide on a stationary rail 6, being supported on same, in the form of a stainless steel rail, which dissipates the heat of friction during operation.

The rail 6 has a longitudinal guiding function for the support elements 3 or the traction elements 2.

The traction elements 2 and the rails 6 are covered with a lateral wall cover 12 each.

In particular, the support elements are carriers in the form of plastic parts, which are moldings and are provided with a good self-lubricating effect, good slidability, good compressive strength and good impact resistance.

The upper side 4 of the support elements 3 has a slight upward arch in the direction of transport F and has a middle, flat depression 7 in the direction of transport F in the area of the traction element 2, such that when an object or a pallet lies on it, the load P is transmitted vertically downwardly to the steel rail. The support elements 3 have essentially an inverted U-shaped cross section, as this can be seen especially in FIGS. 2 and 3.

Figure 4:
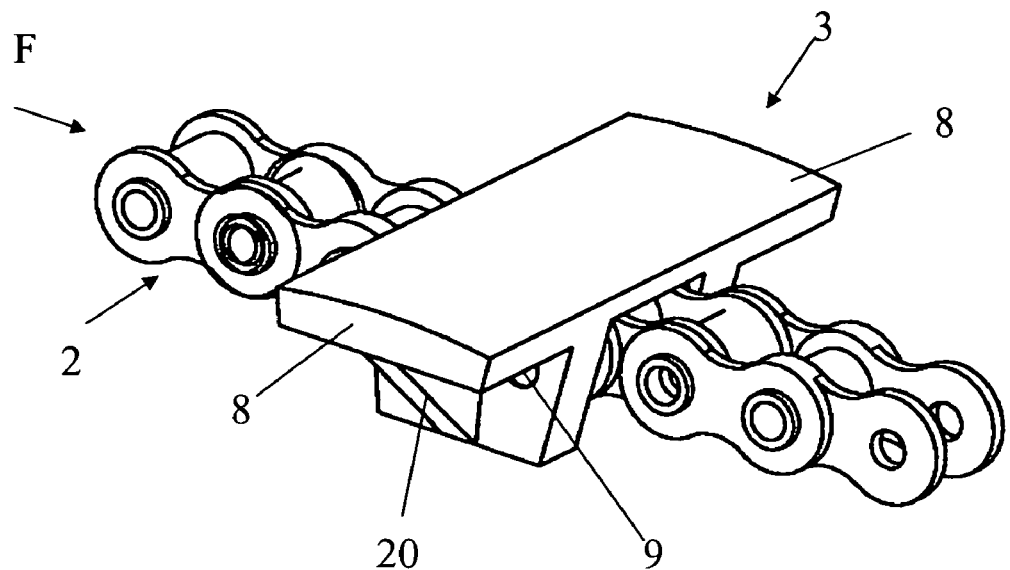
FIG. 4 is a perspective view showing another support element with a traction element strand in views corresponding to FIG. 2 of the first embodiment variant.
Figure 5:
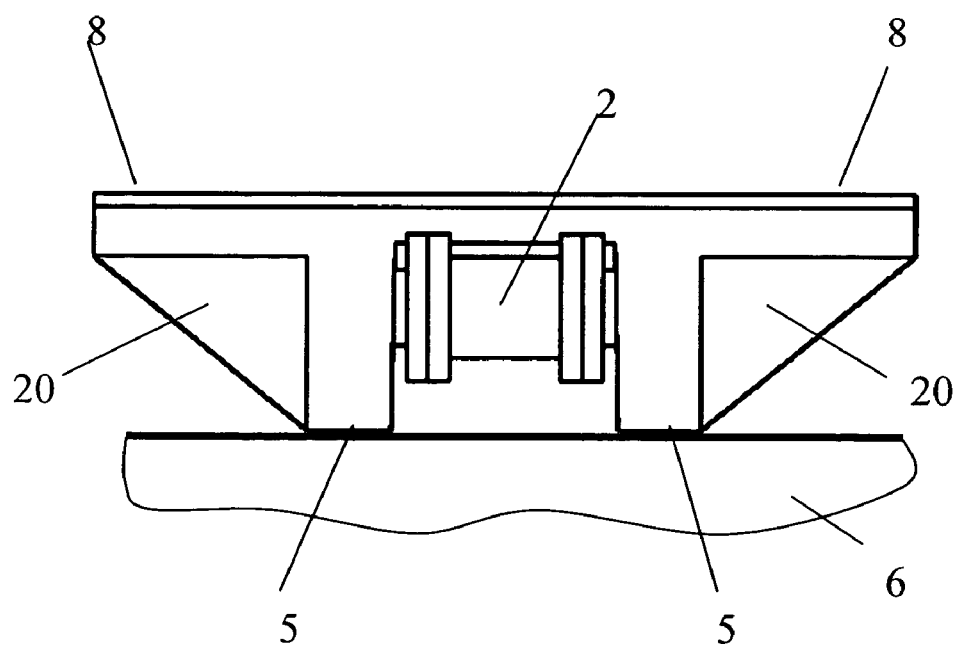
FIG. 5 is a schematic front view showing the another support element with the traction element strand in views corresponding to FIG. 3 of the first embodiment variant.

Support elements 3 of a different design, which have a larger support surface for goods lying on them, are used in a transport device 1 of the aforementioned design in FIGS. 4 and 5.

In particular, the support elements 3 have essentially a "double T"-shaped cross section, and integrated upper support surfaces 8, which bring about the above-mentioned larger support surface, are also provided laterally from the traction element 2 for the goods or the pallet. The upper lateral support surfaces 8 are supported at the bottom by vertical cross struts 20, which disperse the load represented by the goods obliquely downwardly to the lower sliding surface 5.

The support elements 3 according to the first variant as well as according to the second variant may have a two-layer design and have in this case an upper elastic layer, which acts as a flexible skid-resistant flat support pad.

Each support element 3 is fastened at right angles to the direction of transport F via two studs 9 to the traction element 2, namely, the transport chain. The transport chain is a hollow bolt chain. The support elements and carriers made of a slidable plastic are passed through holes in the hollow bolt chain and through corresponding holes in the plastic parts and support elements and are fixed in an easily detachable manner and are thus easy to replace, especially in case of wear.

Both above-mentioned embodiment variants of transport devices 1 are so-called caterpillar transporters, which may be designed as longitudinal transporters and/or transverse transporters.

If the caterpillar transporter is designed as a longitudinal transporter, it has an additional middle support, especially an additional middle transport strand in the manner of the lateral traction elements 2 and the support elements 3, or an additional middle roller or sliding strip.

A transport device 1 of the above-mentioned type may be built up from individual transport path modules, which can be put together, preferably plugged one into another, in the direction of transport F and are essentially of an identical design, corresponding to a desired overall length of a transporter.

While specific embodiments of the invention have been shown and described in detail to illustrate the application of the principles of the invention, it will be understood that the invention may be embodied otherwise without departing from such principles.

The invention claimed is:

1. A transport device for transporting goods or goods on pallets, along a transport path, the device comprising:
    rails;
    lateral, driven peripheral traction elements; and
    support elements by which the goods or the good on a pallet are supported, each of said support elements having at least one surface in sliding engagement with one of said rails, each of said support elements being fixed in an articulated manner to a peripheral traction element.

2. A transport device in accordance with claim 1, wherein the support elements are arranged at closely spaced locations next to one another in a row along the traction element and essentially cover the peripheral traction element.

3. A transport device in accordance with claim 1, wherein each said peripheral traction element has said support elements of its own.

4. A transport device in accordance with claim 1, wherein the support elements have an identical and one-piece design and have a flat upper side.

5. A transport device in accordance with claim 1, wherein the support elements have exclusively a carrying function and the traction elements have exclusively a traction function.

6. A transport device in accordance with claim 5, wherein the support elements slide on a stationary stainless steel rail, being supported by same.

7. A transport device in accordance with claim 6, wherein the rail has a longitudinal guiding function for the support elements or the traction elements.

8. A transport device in accordance with claim 1, wherein the support elements are plastic parts comprising especially moldings, which are preferably provided with a self-lubricating effect, good slidability, good compressive strength and/or good impact resistance.

9. A transport device in accordance with claim 4, wherein an upper side of the support elements has a slight upward arch in the direction of transportation.

10. A transport device in accordance with claim 4, wherein the upper side of the support elements has a flat depression in the direction of transportation in the area of the traction element.

11. A transport device in accordance with claim 1, wherein the support elements have an essentially inverted U-shaped cross section.

12. A transport device in accordance with claim 1, wherein the support elements have an essentially double T-shaped cross section, and said integrated upper support surfaces are also provided laterally from the traction element for the goods or the pallet.

13. A transport device in accordance with claim 1, wherein the support elements have an at least two-layer design and have an upper elastic layer, which acts as a flexible, skid-resistant, flat support pad.

14. A transport device in accordance with claim 1, wherein each said support element is fixed to the traction element in the form of a transport chain, via two studs at right angles to the direction of transportation.

15. A transport device in accordance with claim 1, wherein the transport device forms a longitudinal transporter and/or a transverse transporter.

16. A transport device in accordance with claim 15, wherein the longitudinal transporter has an additional middle transport strand forming one of the lateral traction elements and the support elements, or an additional roller or sliding strip in the middle.

17. A transport device in accordance with claim 1, wherein the support elements are fixed to the traction element in an easily detachable manner and can be replaced.

18. A transport device in accordance with claim 1, wherein the traction elements and/or the rail have a lateral wall cover.

19. A transport device comprising:
a first transport chain;
a first rail for guiding said first transport chain;
a second rail laterally spaced from said first rail for guiding said second transport chain, said first rail and said second rail extending substantially parallel;
a second transport chain laterally spaced from said first transport chain, said first transport chain and said second transport chain being driven to each providing a peripheral transport path;
a first support element with a good or pallet supporting surface, said first support element being articulated to said first transport chain, said first support element having at least one sliding surface in sliding contact with said first rail; and
a second support element with a second support element good or pallet supporting surface, said second support element being articulated to said second transport chain, said second support element having at least one sliding surface in sliding contact with said second rail.

20. A transport device according to claim 19, further comprising:
a drive, wherein said first transport chain has a plurality of said first support elements connected thereto and said second transport chain has a plurality of said second support elements connected thereto.

21. A transport device for transporting goods or goods on pallets, along a transport path, the device comprising:
two lateral, driven peripheral traction elements, said traction elements having exclusively a traction function; and
support elements by which the goods or the good on a pallet are supported, each of said support elements being fixed in an articulated manner to a peripheral traction element, said support elements having exclusively a carrying function, said support elements having at least one lower sliding surface, said support sliding on a stationary steel rail and being supported by same.

22. A transport device for transporting goods or goods on pallets, along a transport path, the device comprising:
two lateral, driven peripheral traction elements, said traction elements having exclusively a traction function; and
support elements by which the goods or the good on a pallet are supported, each of said support elements being fixed in an articulated manner to a peripheral traction element, said support elements having exclusively a carrying function, said support elements having at least one lower sliding surface, said support sliding on a stationary steel rail and being supported by same, said rail having a longitudinal guiding function for said support elements or said traction elements.

23. A transport device for transporting goods or goods on pallets, along a transport path, the device comprising:
two lateral, driven peripheral traction elements; and
support elements by which the goods or the good on a pallet are supported, each of said support elements being fixed in an articulated manner to a peripheral traction element, each support element having an essentially double T-shaped cross section and an upper support surface provided laterally from said traction element for receiving the goods or the pallets.

24. A transport device for transporting goods or goods on pallets, along a transport path, the device comprising:
two lateral, driven peripheral traction elements; and
support elements by which the goods or the good on a pallet are supported, each of said support elements being fixed in an articulated manner to a peripheral traction element, said support elements having at least a two-layer design and an upper elastic layer, which acts as a flexible, skid-resistant, flat support pad.

25. A transport device for transporting goods or goods on pallets, along a transport path, the device comprising:
two lateral, driven peripheral traction elements; and
support elements by which the goods or the good on a pallet are supported, each of said support elements being fixed in an articulated manner to a peripheral traction element, said support elements having at least one lower sliding surface sliding on a rail and the traction elements and/or the rail having a lateral wall cover.

* * * * *